UNITED STATES PATENT OFFICE.

HENRY SPENCER BLACKMORE, OF MOUNT VERNON, NEW YORK, ASSIGNOR TO KALI COMPANY OF AMERICA, OF NEW YORK, N. Y., A CORPORATION OF DELAWARE.

PROCESS OF SECURING WATER-SOLUBLE ALKALI-METAL COMPOUNDS FROM WATER-INSOLUBLE SUBSTANCES.

1,357,025. Specification of Letters Patent. Patented Oct. 26, 1920.

No Drawing. Application filed December 14, 1918. Serial No. 266,693.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Securing Water-Soluble Alkali-Metal Compounds from Water-Insoluble Substances, of which the following is a specification.

This invention relates to a process for transforming substantially water-insoluble alkali or other metal compounds or compositions into water-soluble compounds and securing the same therefrom, and has for one of its objects the transformation, making, and separating of water-soluble alkali-metal compounds or salts from their substantially water-insoluble compounds or minerals, such as their silicon combinations, of compound, composite, or complex silicate or other nature, etc., or the obtaining of potassium carbonate, from orthoclase (potash feldspar), leucite, muscovite (potash mica), glauconite (green sand), or like silicious substances containing the same; and it comprises subjecting the water-insoluble mineral or alkali-metal compound, such as silicate of simple, compound, or composite nature, a new compound of which alkali-metal is desired, for example potash feldspar (orthoclase), to the action of magnesium silicofluorid, or such silicofluorid and water, and preferably augmented by superatmospheric pressure and heat, and separating and recovering the potassium or other products, soluble in hot water, from the residue, by decantation, filtration or other convenient means, thereby securing the hot aqueous solution thereof which upon cooling deposits potassium silicofluorid which is only sparingly soluble in cold water, and thereafter separating the potassium silicofluorid from the natant or mother liquor, and subjecting the same to the action of further chemicals or substances to produce other final products desired as hereinafter more particularly described, such as converting the potassium silicofluorid into potassium carbonate or sulfate, and ammonium or aluminium silicofluorid by the action of ammonium carbonate or aluminium sulfate as hereinafter more particularly described.

In the prior art great difficulty has been experienced in the conversion and separation of water soluble alkali-metal compositions from water insoluble silicious substances or minerals by reason of the fact that the silicious alkali-metal composition was only partially or imperfectly converted or transformed, and its solution and separation from the residue was attended with great difficulty, it being tenaciously retained therein and prevented from readily entering into solution. Another difficulty experienced was that the silicious hydrates formed had a tendency to gelatinize the water present and further retard the securing of the water soluble compound desired; and another difficulty resided in the fact that the residue was usually contaminated with some ingredient employed in the liberation of the potassium from its silicious compound, thus rendering the residue valueless as a commercial commodity, and furthermore great loss was occasioned through the employment of expensive chemicals for the purpose of transformation which were not recovered in an available form for re-use and the heat required and lost through the necessity of the evaporation of large quantity of water to secure small percentages of alkali-metal salts, together with loss by corrosion and wear and tear on the apparatus employed from the action of chemicals and heat made the recovery of water soluble potassium or alkali-metal compounds in the prior art prohibitive by reason of expense and time required from a commercial stand-point, all of which difficulties are sought to be overcome and eliminated in the present process.

As an illustration of the process or manner in which the invention is carried out the recovery of water soluble potassium compounds from potash feldspar or orthoclase by the action of magnesium silicofluorid will be taken, although it will be understood that the process may be employed for the converting, separating and securing of other alkali-metal compounds, such as sodium, lithium, etc., from their respective containing minerals, without departing from the spirit of the invention.

One of the important features in connection with the present invention resides in the fact that the magnesium silicofluorid employed is either inert in excess to the ingredients other than that desired to be transformed and separated, such as a potassium compound from feldspar, or is employed only in proportion to selectively convert and transform the alkali metal compound desired. For instance in the example hereafter given, it will be noted that aluminium potassium silicate, or potassium feldspar (orthoclase) when acted upon in a heated condition under pressure by an aqueous solution of magnesium silicofluorid, only the insoluble potassium silicate is converted and the potassium silicofluorid formed dissolves in the hot water present and separates from solution upon cooling from any excess of solution of magnesium silicofluorid which may be present and which is inert to the aluminium silicate or silicate residue, from which the hot solutions have been parted before cooling.

When magnesium silicofluorid is employed as a substance to transform the potassium silicate in potassium feldspar or orthoclase, the orthoclase is preferably pulverized to a fineness which will pass through a 200 mesh sieve; this is then mixed with a solution of magnesium silicofluorid to the consistency of a thin paste, the magnesium silicofluorid being present in about a molecular proportion to convert the insoluble potassium silicate content of the feldspar into potassium silicofluorid which is soluble in hot water. This mixture of feldspar, water and magnesium silicofluorid is then introduced into an autoclave which is provided with a stirrer and after closing the receptacle it is subjected to the action of heat and pressure, a temperature capable of facilitating the conversion being approximately 350° F. while subjected to a pressure of 200 lbs. The stirring and digesting of the mixture is continued from 3 to 5 hours when it will be found that the greater per cent. of the potassium silicate has been transformed from its water insoluble condition to a hot water soluble potassium silicofluorid. Hot water is then supplied to the mixture to reduce it to a thin fluid condition, it is thoroughly mixed by stirring and the insoluble residue allowed to settle out. The hot solution of potassium silicofluorid is then separated from the residue by decantation, filtration, centrifugal action or other convenient means.

The solution of potassium silicofluorid thus obtained is then allowed to cool down, whereupon being less soluble in cold water it precipitates or crystallizes out and may be readily separated from the supernatant or mother liquor which may contain any excess of magnesium silicofluorid or iron silicofluorid which it may have secured during the operation of the process and which has been thus separated from the residue.

The reaction which takes place may be illustrated by the following chemical equation:

$$Al_2K_2(SiO_3)_4 + MgSiF_6 = Al_2Mg(SiO_3)_4 + K_2SiF_6$$

The potassium silicofluorid produced, preferably in its hot water solution, is exposed to action of ammonia and carbonic acid or ammonium carbonate or bicarbonate which converts the potassium silicofluorid into ammonium silicofluorid and potassium carbonate which compounds may be separated from each other by reason of their differing solubilities in water, the ammonium silicofluorid being preferably dissolved out with a limited amount of water, leaving the potassium carbonate uncontaminated, or the two compounds may be dissolved in water and separated by fractional crystallization.

Instead of converting the alkali-metal silicofluorid into carbonate or bicarbonate by the action of ammonia and carbon dioxid the ammonia and carbon dioxid may be combined through the mediation of water producing ammonium carbonte or bicarbonate and such ammonium carbonate or bicarbonate employed as such, or an aqueous solution, to react with the alkali-metal silicofluorid preferably in hot aqueous solution.

The supernatant liquor containing the ammonium silicofluorid may be re-used in the production of magnesium silicofluorid in the further separating and converting water insoluble alkali-metal containing silicates into water soluble alkali-metal compounds over and over again with little loss.

In employing magnesium silicofluorid as a converting compound, it may be produced by acting upon the potassium silicofluorid product obtained by either or any of the processes enumerated with magnesium sulfate directly or in aqueous solution, in which case potassium sulfate will result, which may be separated in a similar manner from the magnesium silicofluorid.

While the reactions indicating the processes as afore enumerated may be carried out under ordinary atmospheric pressure in a heated condition, still it is found advantageous to heat and agitate the materials during conversion with water under pressure as set forth, it being obvious that instead of using water in conjunction with the ingredients during conversion the materials may be mixed and heated *per se* in substantially dry form under ordinary or superatmospheric pressure, and the compounds desired separated from the residues by the action of hot water without departing from the spirit of the invention.

In the prior art it has been contemplated to employ hydrofluosilicic acid as such to convert silicates, such as silicate of aluminium and silicate of potassium into double potassium and aluminium fluosilicates and to employ this acid as such as a catalytic agent in the direct conversion of such silicates into sulfates by associating a small quantity of hydrofluosilicic acid with sulfuric acid employed simultaneously in conjunction with the water insoluble silicates and as distinguishing such processes from the present invention it should be noted that no free hydrofluosilicic acid is employed herein but only such neutral or alkaline fluosilicates as will interact with water insoluble alkali-metal containing compounds to liberate the alkali-metal compound in a form soluble in hot water without the intermediation or employment of hydrofluosilicic acid either as such or in such small proportions in conjunction with other acids, such as sulfuric, as might be defined as a catalytic agent in any manner whatsoever.

The disadvantage in employing hydrofluosilicic acid either as such or associated with others as a catalytic agent resides in the fact that at elevated temperatures the hydrofluosilicic acid is disrupted into hydrofluoric acid, which is of extremely corrosive nature with reference to the apparatus and silicon fluorid which escapes as a gas and finally chokes the flues and conduits with precipitated silica when contacting wet steam or moisture on cooling and further results in the gelatinization of the aqueous ingredients, thus interfering with and retarding the steps of conversion of the mineral and securing of the product, all of which are obviated by the employment of neutral or alkaline fluosilicates as herein set forth.

In the prior art, one of the causes of considerable expense has been the separation and securing of the extremely water soluble potassium or alkali-metal compound from the associated water through evaporation of the water from the aqueous solution as a whole down to a point at which the alkali-metal compound crystallizes. This expense is considerably reduced in the present process by reason of the fact that the intermediate product of conversion of the alkali-metal compound, viz: from the water insoluble silicates to the water soluble carbonates and sulfates is accomplished through the inherent property of the intermediate alkali-metal silicofluorid being quite soluble in hot water while it is only sparingly soluble in cold water and the compound is separated from the water of its solution by cooling and refrigeration as contradistinguished to and from the heating, boiling, and evaporation of the large amount of water which constitutes the major portion of the solution as practised in the prior art.

The residue obtained in the present process contains substantially all the aluminium silicate which existed in the original feldspar or mineral treated associated with magnesium silicate formed from the silica left by the potassium or other alkali-metal separated and is free from iron and similar contamination, which results in an educt of commercial value superior to the initial or primary substance, viz: feldspar, employed as a source which does not result as either a product or educt in the processes of the prior art.

It is advisable to augment the metal silicofluorid and its action with a portion of ammonium silicofluorid which facilitates the disintegration, decomposition and transformation of the alkali-metal silicate and the forming, separating and yielding of the more water soluble alkali-metal compound.

The pressure under which the ingredients exist at the time of transformation may differ from that produced when water alone is employed at any corresponding or particular temperature, for the reason that the larger the percentage or proportion of the alkali-metal compound there is in solution the higher the boiling point will be and the less pressure will be produced, when it is confined, by the same amount of heat, i. e. a caustic alkali containing forty per cent. of water may be melted at red heat and the vaporization of the water will be so restrained and the water so retained and held by the affinity of the caustic alkali that practically no pressure will be generated at that temperature if it is confined.

An externally applied gas pressure such as by carbon dioxid, greater than that vapor pressure which would be generated by auto expansion of steam by heat in a closed receptacle, may also be employed.

Instead of employing feldspar such as orthoclase or leucite which is a double silicate of aluminium and potassium other alkali-metal or potassium containing silicates may be employed such as glauconite or green sand which comprises principally hydrous silicate of iron and potassium from which the potassium may be separated by the action of an unlike alkali-metal silicofluorid such as sodium silicofluorid or iron silicofluorid or other water soluble non-acid metal silicofluorids, the metal base of which is capable of displacing the potassium content of the mineral and transforming it into potassium silicofluorid, or alkali silicofluorid such as ammonium silicofluorid in accordance with the present process without departing from the spirit of the invention.

Under certain conditions and with adaptable metal silicofluorids the base of which has greater affinity for silica under the conditions employed than either or all of the bases combined with silica in the mineral or substance to be acted upon, such as aluminium and potassium in orthoclase or leucite hot water soluble compounds of both, these bases aluminium and potassium may be produced, separated and procured, such as silicofluorids of aluminium and potassium without departing from the spirit of the invention.

Any or all non-acid silicofluorids individually or collectively which may be selectively adaptable to the carrying out of the process may be also employed under selective conditions of pressure and temperature whether it be normal, sub or super atmospheric pressure or normal, sub or super atmospheric temperature, and the reactions may be performed between the ingredients *per se* or augmented by suitable vehicles or menstruums of solvent or other nature, of normally fluid or other form, such as water, or other suitable liquid without departing from the spirit of the invention.

The pressure to which the ingredients are subjected may be derived from the auto expansion of steam through the influence of heat while confined as in a heated autoclave provided with an adjustable process and relief valve or exterior means through the mediation or supplying of gas at a superior pressure as by carbon dioxid, ammonia or other gaseous fluid supplied from a reservoir containing the same capable of generating such pressure as derived from a cylinder containing the gas in liquefied form or supplied through the actuation of a pump or other compression and supply device, the gaseous fluid in such cases may also be of reactive, inert, or conversion augmenting nature, such as compressed air, which would retard the vaporization and increase and elevate the boiling point to a temperature above normal under ordinary atmospheric conditions.

It is advisable to augment the process by subjecting the reacting ingredients to successive increased and decreased pressure whereby the gaseous fluids supplied are charged and discharged into and from the associated fluids or liquids and associated ingredients progressively resulting in the successive settling and foaming and frothing which tends to augment the disintegrating and disrupting of finely divided solids by individually exposing and dissipating them and rapidly effecting the transformation, conversion and delivery of the insoluble contained alkali-metal compounds into soluble alkali-metal compounds and their separation and securing from the insoluble residue by the resulting auto foaming or washing operation, the temperature of the reacting ingredients may also be successively altered at intervals by increasing and decreasing the form to facilitate conversion which is also enhanced by a corresponding increase and decrease of pressure during the charging and discharging performance.

The metals included under the head of the "magnesium group" are magnesium, beryllium, zinc, cadmium, and mercury as noted in vol. 3, page 163 of *Watts Dictionary of Chemistry* (Morley and Muir) Longmans Green and Co., New York, 1906.

Having now described my invention what I claim is:

1. The process of converting substantially water insoluble alkali-metal containing silicates into a more water soluble alkali-metal compound, which comprises exposing such insoluble compound to the action of a non-acid metal-silicofluorid, separating the resultant soluble product therefrom and exposing it to the action of a chemical reagent capable of producing a still more soluble alkali-metal compound.

2. The process of converting substantially water insoluble aluminium and alkali-metal containing silicates into a more water soluble alkali-metal compound, which comprises exposing such insoluble compound to the action of a non-acid metal-silicofluorid, separating the resultant soluble product therefrom and exposing it to the action of a chemical reagent capable of producing a still more soluble alkali-metal compound.

3. The process of converting substantially water insoluble potassium containing silicate into a more water soluble potassium compound, which comprises exposing such insoluble compound to the action of a non-acid metal-silicofluorid, separating the resultant soluble product therefrom, and exposing it to the action of a chemical reagent capable of producing a still more soluble potassium compound.

4. The process of converting substantially water insoluble aluminium and potassium containing silicates into a more water soluble potassium compound, which comprises exposing such insoluble compound to the action of a non-acid metal-silicofluorid, separating the resultant soluble product therefrom and exposing it to the action of a chemical reagent capable of producing a still more soluble potassium compound.

5. The process of converting feldspar into a more water soluble alkali-metal compound, which comprises exposing such feldspar to the action of a non-acid metal-silicofluorid, separating the resultant soluble product therefrom and exposing it to the action of a chemical reagent capable of producing a still more soluble alkali-metal compound.

6. The process of converting substantially water insoluble potassium containing silicates into potassium carbonate, which comprises exposing such insoluble compound to the action of magnesium silicofluorid, water and heat, separating the resultant solution therefrom, cooling the same, removing the water from the precipitate and exposing it to the action of ammonium carbonate, and separating the ammonium silicofluorid thus formed from the potassium carbonate formed.

7. The process of converting substantially water insoluble alkali metal containing silicates into alkali metal carbonate, which comprises exposing such insoluble compound to the action of magnesium silicofluorid, water and heat, separating the resultant solution therefrom, cooling the same, removing water from the precipitate and exposing it to the action of ammonium carbonate, and separating the ammonium silicofluorid thus formed from the alkali-metal carbonate formed.

8. The process of converting substantially insoluble alkali metal aluminium containing silicates into alkali metal carbonate and aluminium-magnesium containing silicate, which comprises exposing the insoluble compound to the action of magnesium silicofluorid, water and heat, separating the resultant solution from the aluminium-magnesium containing silicate educt, cooling the solution, removing the water from the precipitate and exposing it to the action of ammonium carbonate, and finally separating the ammonium silicofluorid thus formed by dissolving the same in a limited amount of water.

9. The process of converting potassium containing silicates substantially insoluble in water into potassium carbonate, which comprises exposing the insoluble compound to the action of magnesium silicofluorid, water and heat, separating the resultant solution therefrom, cooling the same, removing the water from the precipitate, exposing the precipitate to the action of ammonium carbonate, and separating the resultant ammonium silicofluorid.

10. The process of converting substantially insoluble potassium and aluminium containing silicates into potassium carbonate and aluminium-magnesium containing silicate, which comprises exposing the insoluble compound to the action of magnesium silicofluorid, water, and heat, separating the resultant solution from the aluminium-magnesium containing silicate educt, cooling the solution, removing the water from the precipitate, exposing the precipitate to the action of ammonium carbonate, and finally separating the ammonium silicofluorid thus formed by dissolving the same in a limited amount of water.

11. The process of converting substantially water insoluble alkali-metal containing silicates into a more water soluble alkali-metal compound, which comprises exposing such insoluble compound to the action of a non-acid metal-silicofluorid under superatmospheric pressure, separating the resultant soluble product therefrom and exposing it to the action of a chemical reagent capable of producing a still more soluble alkali-metal compound.

12. The process of converting substantially water insoluble aluminium and alkali-metal containing silicates into a more water soluble alkali-metal compound, which comprises exposing such insoluble compound to the action of a non-acid metal-silicofluorid under superatmospheric pressure, separating the resultant soluble product therefrom and exposing it to the action of a chemical reagent capable of producing a still more soluble alkali-metal compound.

13. The process of converting substantially water insoluble potassium containing silicate into a more water soluble potassium compound, which comprises exposing such insoluble compound to the action of a non-acid metal-silicofluorid under superatmospheric pressure, separating the resultant soluble product therefrom, and exposing it to the action of a chemical reagent capable of producing a still more soluble potassium compound.

14. The process of converting substantially water insoluble aluminium and potassium containing silicates into a more water soluble potassium compound, which comprises exposing such insoluble compound to the action of a non-acid metal-silicofluorid under superatmospheric pressure, separating the resultant soluble product therefrom and exposing it to the action of a chemical reagent capable of producing a still more soluble potassium compound.

15. The process of converting feldspar into a more water soluble alkali-metal compound, which comprises exposing such feldspar to the action of a non-acid metal-silicofluorid under superatmospheric pressure, separating the resultant soluble product therefrom and exposing it to the action of a chemical reagent capable of producing a still more soluble alkali compound.

16. The process of converting substantially water insoluble potassium containing silicates into potassium carbonate, which comprises exposing such insoluble compound to the action of magnesium silicofluorid, water and heat under superatmospheric pressure, separating the resultant solution therefrom, cooling the same, removing the water from the precipitate and exposing it to the action of ammonium carbonate and separating the ammonium silicofluorid thus formed from the potassium carbonate formed.

17. The process of converting substantially water insoluble alkali metal containing silicates into alkali metal carbonate, which comprises exposing such insoluble compound to the action of magnesium silicofluorid, water and heat under superatmospheric pressure, separating the resultant solution therefrom, cooling the same, removing water from the precipitate and exposing it to the action of ammonium carbonate, and separating the ammonium silicofluorid thus formed from the alkali-metal carbonate formed.

18. The process of converting substantially insoluble alkali metal aluminium containing silicates into alkali metal carbonate and aluminium-magnesium containing silicate, which comprises exposing the insoluble compound to the action of magnesium silicofluorid, water and heat under superatmospheric pressure, separating the resultant solution from the aluminium-magnesium containing silicate educt, cooling the solution, removing the water from the precipitate and exposing it to the action of ammonium carbonate, and finally separating the ammonium silicofluorid thus formed by dissolving the same in a limited amount of water.

19. The process of converting potassium containing silicates substantially insoluble in water into potassium carbonate, which comprises exposing the insoluble compound to the action of magnesium silicofluorid, water and heat under superatmospheric pressure, separating the resultant solution therefrom, cooling the same, removing the water from the precipitate, exposing the precipitate to the action of ammonium carbonate, and separating the resultant ammonium silicofluorid.

20. The process of converting substantially insoluble potassium and aluminium containing silicates into potassium carbonate and aluminium-magnesium containing silicate, which comprises exposing the insoluble compound to the action of magnesium silicofluorid, water and heat under superatmospheric pressure, separating the resulting solution from the aluminium-magnesium containing silicate educt, cooling the solution, removing the water from the precipitate, exposing the precipitate to the action of ammonium carbonate, and finally separating the ammonium silicofluorid thus formed by dissolving the same in a limited amount of water.

21. The process of converting substantially water insoluble potassium containing silicate into a more soluble potassium compound which comprises exposing such insoluble compound to the action of a non-acid metal-silicofluorid, the base of which is capable of transforming the potassium content thereof into a potassium compound soluble in hot water.

22. The process of converting substantially water insoluble potassium containing silicate into a more soluble potassium compound which comprises exposing such insoluble compound to the action of a non-acid metal-silicofluorid under superatmospheric pressure, the base of which is capable of transforming the potassium content thereof into a potassium compound soluble in hot water.

23. The process of converting substantially water insoluble potassium containing silicate into a more soluble potassium compound which comprises exposing such insoluble compound to the action of magnesium silicofluorid.

24. The process of converting substantially water insoluble potassium containing silicate into a more soluble potassium compound which comprises exposing such insoluble compound to the action of magnesium silicofluorid under superatmospheric pressure.

25. The process of converting substantially water insoluble potassium containing silicate into a more soluble potassium compound which comprises exposing such insoluble compound to the action of a non-acid metal silicofluorid, the base of which is capable of transforming the potassium content thereof into a potassium compound soluble in hot water, and augmenting the transformation by the action of ammonium silicofluorid.

26. The process of converting substantially water insoluble potassium containing silicate into a more soluble potassium compound which comprises exposing such insoluble compound to the action of a non-acid metal silicofluorid under superatmospheric pressure, the base of which is capable of transforming the potassium content thereof into a potassium compound soluble in hot water, and augmenting the transformation by the action of ammonium silicofluorid.

27. The process of converting substantially water insoluble potassium containing silicate into a more soluble potassium compound which comprises exposing such insoluble compound to the action of magnesium silicofluorid, and augmenting the transformation by the action of ammonium silicofluorid.

28. The process of converting substantially water insoluble potassium containing silicate into a more soluble potassium compound which comprises exposing such insoluble compound to the action of magnesium silicofluorid under superatmospheric pressure, and augmenting the transformation by the action of ammonium silicofluorid.

29. The process of converting substantially water insoluble potassium containing silicate into a more soluble potassium compound, which comprises exposing such insoluble compound to the action of silicofluorid of a metal of the magnesium group.

30. The process of converting substantially water insoluble potassium containing silicate into a more soluble potassium compound, which comprises exposing such insoluble compound to the action of silicofluorid of a metal of the magnesium group under superatmospheric pressure.

31. The process of converting substantially water in soluble alkali-metal containing silicate into a more soluble alkali-metal compound, which comprises exposing such insoluble compound to the action of silicofluorid of a metal of the magnesium group.

32. The process of converting substantially water insoluble alkali-metal containing silicate into a more soluble alkali-metal compound, which comprises exposing such insoluble compound to the action of silicofluorid of a metal of the magnesium group under superatmospheric pressure.

In witness whereof I affix my signature in the presence of two witnesses.

HENRY SPENCER BLACKMORE. [L. S.]

Witnesses:
ERNEST H. BALL,
F. L. WHOITNER.